United States Patent [19]

Willemsen

[11] Patent Number: 4,938,518
[45] Date of Patent: Jul. 3, 1990

[54] VEHICLE PARTITION ASSEMBLY

[76] Inventor: James A. Willemsen, 11670 Virgil, Redford, Mich. 48239

[21] Appl. No.: 259,711

[22] Filed: Oct. 19, 1988

[51] Int. Cl.⁵ .............................................. B60R 1/00
[52] U.S. Cl. .................................... 296/24.1; 160/330
[58] Field of Search ................. 296/24.1; 160/89, 123, 160/330, 237

[56] References Cited

U.S. PATENT DOCUMENTS

| | | | |
|---|---|---|---|
| Re. 31,328 | 8/1983 | Anderson et al. | 160/330 X |
| 2,782,846 | 2/1957 | Bussard | 296/24.1 X |
| 3,331,425 | 7/1967 | Groves et al. | 160/237 X |
| 3,632,154 | 1/1972 | Woodrich | 296/24.1 |
| 3,667,801 | 6/1972 | Setina | 296/24.1 |
| 4,015,875 | 4/1977 | Setina | 296/24.1 |
| 4,095,837 | 6/1978 | Hunter | 296/24.1 |
| 4,621,856 | 11/1986 | McKenzie | 296/24.1 |
| 4,639,031 | 1/1987 | Truckenbrodt | 296/24.1 |
| 4,738,480 | 4/1988 | Ward | 296/24.1 |

Primary Examiner—Margaret A. Focarino
Assistant Examiner—Gary C. Hoge
Attorney, Agent, or Firm—Weintraub, DuRoss & Brady

[57] ABSTRACT

The invention serves as a thermal barrier between the passenger compartment and the cargo area of a vehicle to be used to transport cargo, enabling elongated objects to be stored along the entire internal length of the vehicle, while at the same time enabling the driver of the vehicle to have a clear and unobstructed view of the rear window of the vehicle. The assembly is mounted across the width of a vehicle and is secured across the top of the vehicle. The assembly includes a crossmember, a viewing means, and a suspended thermal barrier. The thermal barrier comprises a plurality of flexible transparent strips which form a curtain. The flexible strips extend substantially to the floor of the vehicle, in an overlapping relationship with each adjacent strip.

18 Claims, 1 Drawing Sheet

VEHICLE PARTITION ASSEMBLY

BACKGROUND OF THE INVENTION

1. Field of the Invention

The present invention relates to a vehicle partition assembly, and more particularly, to a partition assembly for a vehicle for transporting cargo, the assembly having a first portion which enables the driver to have a clear view of the rear window, and a second portion which provides a thermal barrier for the passenger compartment and enables storage throughout the length of the vehicle.

2. Background Art

Trucks, vans, and the like which are used for transporting materials are often not properly insulated. These vehicles are commonly used for transporting lumber, ladders, poles, furniture, tools, and similar elongated materials that may extend throughout the entire inside length of the vehicle. When these vehicles are used for transporting materials over long distances, it is expensive and inefficient to maintain the entire vehicle at a temperature that is comfortable for the driver. Since many of these vehicles are not air-conditioned, a separation between the passenger compartment and the cargo area, is necessary to maintain a comfortable temperature within the passenger compartment. It may be necessary to open part of the cargo area to fit everything therein, which further complicates the problem of driver comfort.

Various temperature barriers have been designed which may be used to isolate the passenger compartment from the cargo area.

Woodrich in U.S. Pat. No. 3,632,154 discloses a heat retaining partition for a van, the partition being disposed to define an operator's compartment in the front portion of the van. The partition includes a wall constructed of a material which is flexible and transparent, and which extends from the ceiling of the vehicle to the floor of the vehicle. This partition does not enable the driver to use the full length of the vehicle for storage.

McKenzie in U.S. Pat. No. 4,621,856 discloses a partition that may be readily attachable and detachable. The partition comprises a panel which is adapted to seal off the rear cargo area of the vehicle. The unitary panel has a top portion, a middle portion, and a rear portion, each portion extending across the width of the vehicle. The upper portion and the lower portion are tilted toward the front of the vehicle, and the middle portion is substantially vertical. This partition does not permit efficient usage of the full length of the vehicle for storage.

Truckenbrodt in U.S. Pat. No. 4,639,031 discloses a repositionable thermal barrier for truck trailers. The barrier includes a hanger bar extending across the width of the trailer and a flexible strip-type or a blanket-type thermal insulator supported by the hanger bar. The barrier is mounted to a track assembly and is movable within the truck trailer. This strip materials invariably gets faded, scratched, and worn over a period of usage, thereby impairing the vision of the driver through the rear window of the vehicle, and thereby creating a safety hazard.

SUMMARY OF THE INVENTION

What is needed is a thermal barrier to surround the passenger compartment which enhances ventilation through the passenger compartment. The barrier will enable elongated objects to be stored along the entire internal length of the vehicle, while at the same time enabling the driver of the vehicle to have a clear view of the rear window. Also, the barrier will minimize dust flow from the cargo area into the passenger compartment.

The partition assembly of the present invention overcomes the shortcomings of the prior art, and provides such a barrier. The assembly is mounted across the width of a vehicle, and divides the vehicle into a front compartment and a rear compartment. The assembly includes a means for attachment to the ceiling of the vehicle, a crossmember, viewing means, and a thermal barrier.

The suspending means includes a bracket which co-operates with the ceiling of the vehicle. The bracket is in slidable engagement with the ceiling of the vehicle and thereby varies the size of the compartments.

In the preferred embodiment of the present invention, the crossmember physically separates the assembly into an upper portion and a lower portion. The crossmember has a frame attached thereto, and the frame has a track formed therein. A slidable glass-type panel is disposed within the upper portion of the assembly, and the glass-type panel is disposed between the rear view mirror and the rear window of the vehicle. The panel is capable of sliding movement within the track, thereby enabling a better circulation of air within the vehicle. The lower portion completes the thermal barrier, and preferably includes a plurality of flexible strips suspended from the crossmember, forming a curtain across the width of the vehicle. The flexible strips extend substantially to the floor of the vehicle, in an overlapping relationship with each adjacent strip.

For a more complete understanding of the vehicle partition assembly of the present invention, reference is made to the following detailed description and accompanying drawings in which the presently preferred embodiment of the invention is illustrated by way of example. As the invention may be embodied in several forms without departing from the spirit or essential characteristics thereof, it is expressly understood that the drawings are for purposes of illustration and description only, and are not intended as a definition of the limits of the invention.

Throughout the following description and drawings, identical reference numbers refer to the same component throughout the several views.

DESCRIPTION OF THE PREFERRED EMBODIMENT OF THE INVENTION

Figure 1:
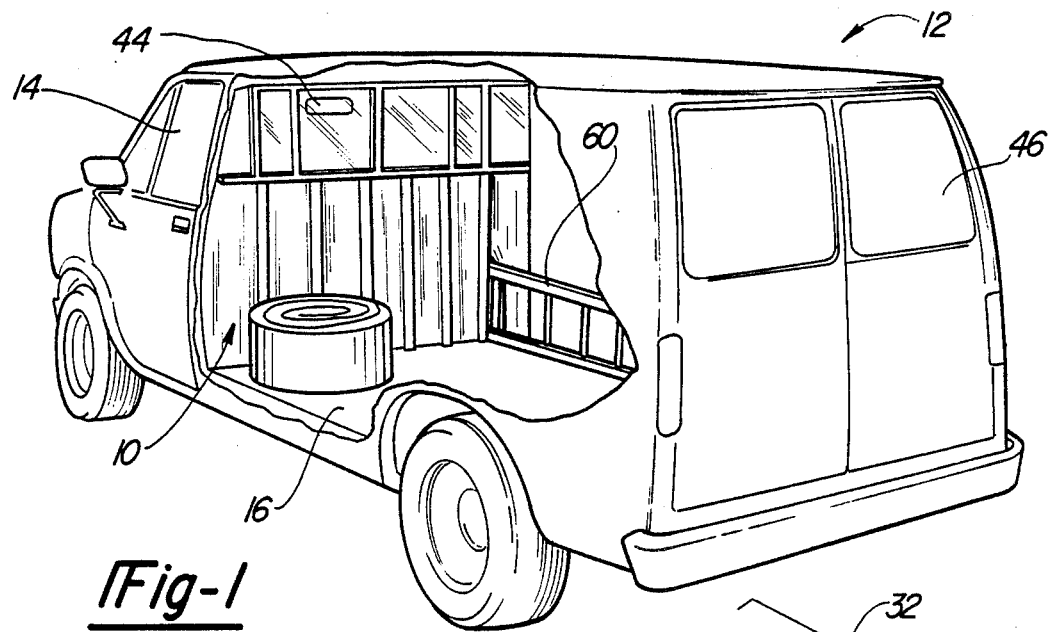
FIG. 1 is a perspective view of the preferred embodiment of the partition assembly of the present invention mounted within the cargo compartment of van.

Referring now the drawings, FIG. 1 depicts the preferred embodiment of the partition assembly 10 of the present invention mounted within a vehicle 12.

The assembly 10 serves as a temperature barrier between the passenger or front compartment 14 and the rear compartment 16 of the vehicle. The assembly 10 is suspended across the width of the vehicle. The assembly 10 includes a crossmember 20, means for suspending 30 to the vehicle, viewing means 40, and a thermal barrier 50 suspended from crossmember 20.

The crossmember 20 physically separates the partition assembly 10 into a first portion 22 and a second portion 24. A frame 26 is attached to the crossmember 20, the frame 26 having a track 28 formed therein. Preferably, the first portion 22 is an upper portion and the second portion 24 is a lower portion. However, an alternate configuration (not shown) would be the first portion 22 being disposed along the left-side portion of the vehicle behind the driver, and the second portion 24 along the right-side portion.

Figure 2:
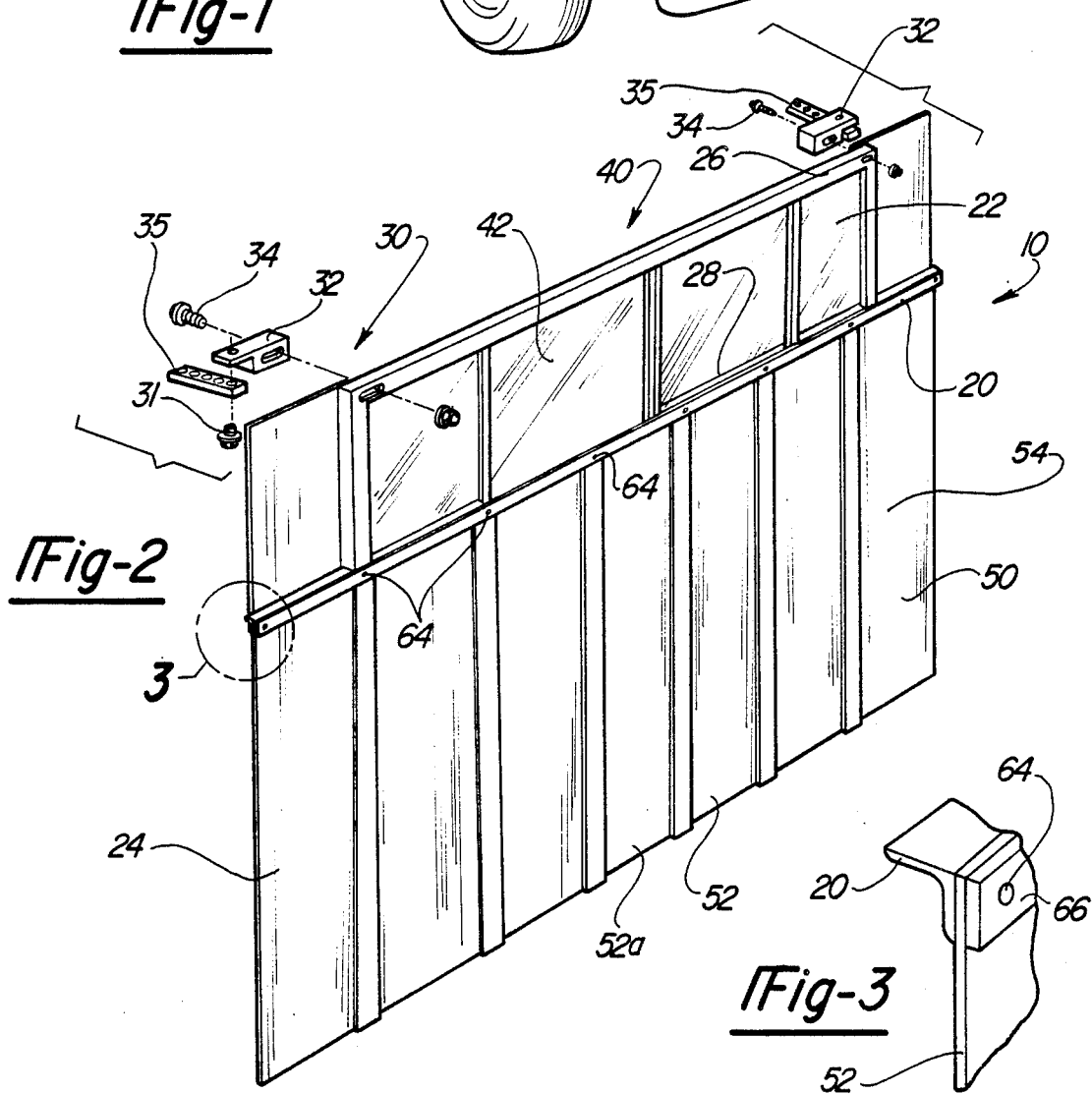
FIG. 2 is a perspective view of the partition assembly of FIG. 1, including a details of (a) the means for attaching the assembly to the ceiling of the vehicle, and (b) the attachment between the crossmember and the vinyl strips.

The suspending means 30 includes a bracket 32 and a threaded fastener 34 (see FIG. 2). The bracket 32 is secured to the top of the assembly 10 and is readily adjustable by threaded fastener 31 to maintain the assembly in a fixed position within the vehicle 12. Bracket 32 is adaptable to fit between a pair of lip-type flanges 35 (depending upon the make and model of the vehicle) integral with and mounted across the ceiling of the vehicle 12. Fastener 31 includes a nut with a nylon insert. The bracket 32 acting in cooperation with a pair flanges 35, enables the assembly 10 to be slidably suspended within the flanges 35 in any of a plurality of positions within the vehicle 12. Fastener 34 maintains the assembly 10 in place relative to the vehicle 12. The flanges 35 are integral and original equipment with the ceiling of most mini-vans, but the flanges 35 can be easily installed if necessary. The assembly 10 is suspended from the flanges 35 by the bracket 32 affixed across the top of the first portion 22 of the assembly. The bracket 32 slidable engages the flanges 35, and thereby varies the size of the front compartment 14 and the rear compartment 16. The suspending means 30 may be removed from the flanges 35 enabling the assembly 10 to be withdrawn from the vehicle 12.

The viewing means 40 comprises a glass-type panel 42, such as plexiglass, which is disposed within the first portion 22 of the assembly, between the rear view mirror 44 and the rear window 46 of the vehicle. The panel 42 is capable of sliding movement within the track 28. During moderate temperature conditions the panel 42 may be slid within the track 28 into an open position, thereby enabling a driver who is seated in the front compartment 14 to have an unobstructed view of the rear window 46. The panel may also be a solid glass-type panel (not shown) that fits across the entire first portion 22 of the assembly. The sliding panel is preferred to improve the ventilation of the vehicle, since these vehicles are generally not air-conditioned.

The second portion 24 of the assembly is a thermal barrier 50, preferably suspended form the crossmember 20. The suspended thermal barrier 50 preferably comprises a plurality of flexible strips 52 suspended from the crossmember 20, and forming a curtain 54 across the assembly 10. The flexible, transparent strips are of sufficient weight and thickness to be suspended from the crossmember 20 extending substantially to the floor of the vehicle 12. The strips 52 open and close about an object extending therethrough to minimize the amount of heat transferred through the thermal barrier 50. The suspended thermal barrier 50 thus enables the front compartment 14 to be maintained at a first temperature and the rear compartment 16 to be maintained at a second temperature. The thermal barrier may be an elastomeric material, consisting of a plurality of nylon reinforced vinyl strips. Each strip 52 is suspended in an overlapping relationship with each adjacent strip 52a.

Figure 3:
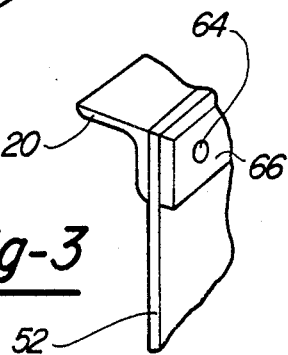
FIG. 3 is an exploded detail view of the metal strip and the crossmember of FIG. 2 securing the plurality of overlapping flexible strips.

A plurality of bolts 64 secure the plurality of strips 52 to the crossmember 20 (see FIG. 3). The crossmember may be one-inch angle iron. The strips are suspended in overlapping engagement so that each bolt 64 (except for the end bolts) is secured to two strips 52. A metal strip 66, preferably made of steel, extends across the crossmember 20, so that each bolt 64 engages first the metal strip 66, then two transparent strips 52, and finally the crossmember 20.

The partition assembly 10 enables the vehicle 12 to store elongated objects 60 therein, such objects extending longitudinally through the suspended thermal barrier 50, while minimizing heat flow across the partition assembly 10. The elongated objects 60 extend between the flexible strips 52 from the front compartment 14 and into the rear compartment 16 of the vehicle.

While the vehicle partition assembly 10 has been described in conjunction with a specific embodiment, many alternatives, modifications, and variations will be apparent to those skilled in the art in light of the disclosure herein. It is intended that the metes and bounds of the invention be determined by the appended claims rather than by the language of the above specification, and that such alternatives, modifications, and variations which form a functional or cooperative equivalent are intended to be included within the spirit and scope of these claims.

I claim:

1. An assembly for mounting in a vehicle, the vehicle being capable of storing and transporting elongated objects extending longitudinally within the vehicle, the inside of the vehicle having a width and a length, the assembly being mountable across the width of the vehicle thereby dividing the vehicle into a front compartment and a rear compartment, the vehicle having a rear view mirror disposed in the front compartment and a rear window disposed in the rear compartment, the assembly comprising:

(a) means for suspending the assembly from the vehicle, the suspending means cooperating with the ceiling of the vehicle to secure the assembly thereto;

(b) a thermal barrier disposed across the width of the vehicle, the thermal barrier enabling the front compartment to be maintained at a first temperature and the rear compartment to be maintained at a second temperature;

(c) a transparent panel disposed between the rear view mirror and the rear window of the vehicle, the transparent panel being rigid; and (d) means which enable the elongated objects to be stored throughout the entire length of the vehicle, across and through the thermal barrier, the elongated objects extending from the front compartment and into the rear compartment of the vehicle.

2. The assembly of claim 1, wherein the storing means comprises a plurality of flexible strips forming a curtain across the assembly, the strips being formed of an elastomeric material.

3. The assembly of claim 1, wherein the suspending means comprises a bracket and a fastener, the bracket being affixed across the top of the assembly, a flange being integral within the ceiling of the vehicle, the bracket cooperating with the flange to enable the assembly to be slidably suspended within the flange in any of a plurality of positions, the fastener cooperating with the bracket and the flange to retain the assembly to a selected position within the flange.

4. The assembly of claim 1, further comprising:
   (e) a crossmember which physically separates the assembly into a first portion and a second portion; and
   (f) a frame that is attachable to the crossmember, the frame being disposed within the first portion of the assembly, the frame having a track formed therein, and the transparent panel being slidably moveable within the track.

5. An assembly for mounting in a vehicle, the vehicle being capable of storing and transporting elongated objects extending longitudinally within the vehicle, the inside of the vehicle having a width, a length, and a ceiling, the assembly being mountable across the width of the vehicle and thereby dividing the vehicle into a front compartment and a rear compartment, the vehicle having a rear view mirror disposed in the front compartment and a rear window disposed in the rear compartment, the assembly comprising:
   (a) means for suspending the assembly from the vehicle of the vehicle;
   (b) a crossmember which physically separates the assembly into a first portion and a second portion;
   (c) a viewing means being disposed within the first portion of the assembly between the rear view mirror and the rear window, the viewing means being rigid; and
   (d) a thermal barrier being disposed within the second portion of the assembly, the thermal barrier enabling the front compartment to be maintained at a first temperature and the rear compartment to be maintained at a second temperature.

6. The assembly of claim 5, wherein the thermal barrier enables the storage of elongated objects extending from the front compartment and into the rear compartment of the vehicle.

7. The assembly of claim 5, wherein the crossmember extends substantially through the assembly.

8. The assembly of claim 5, wherein a plurality of flexible strips are suspended from the crossmember.

9. The assembly of claim 8, wherein the plurality of flexible strips form a curtain across the assembly.

10. The assembly of claim 5, wherein the suspending means comprises a bracket and a fastener, the bracket being affixed across the top of the assembly, a flange being integral within the ceiling of the vehicle, the bracket cooperating with the flange to enable the assembly to be slidably suspended within the flange in any of a plurality of positions, the fastener cooperating with the bracket and the flange to retain the assembly to a a selected position within the flange.

11. The assembly of claim 5, wherein the viewing means comprises a frame which is mounted in the first portion of the assembly, attachable to the crossmember, the frame having a track formed therein, and a transparent panel being slidably moveable within the track.

12. The assembly of claim 9, wherein each flexible strip extends substantially to the floor of the vehicle in an overlapping relationship with adjacent strips.

13. The assembly of claim 9, wherein each strip is formed of an elastomeric material.

14. An assembly for mounting in a vehicle, the vehicle being capable of storing and transporting elongated objects extending longitudinally within the vehicle, the inside of the vehicle having a width and a length, the assembly being mountable across the width of the vehicle dividing the vehicle into a front compartment and a rear compartment, the vehicle having a rear window disposed in the rear compartment, the assembly comprising:
   (a) means for suspending the assembly from the vehicle, the suspending means cooperating with the ceiling of the vehicle, the suspending means being capable of sliding engagement within the vehicle ceiling, thereby enabling the assembly to vary the size of the first compartment and the second compartment;
   (b) a crossmember which physically separates the assembly into a first portion and a second portion, the crossmember having a frame attached thereto, the frame having a track formed therein;
   (c) a transparent panel being disposed within the first portion of the assembly between the rear view mirror and the rear window, the panel being slidably moveable within the track; and
   (d) a plurality of flexible strips forming a curtain across the second portion of the assembly, the flexible strips extending substantially to the floor of the vehicle in an overlapping relationship with each other, the flexible strips providing a thermal barrier between the front compartment and the rear compartment.

15. The assembly of claim 14, wherein the elongating objects extend from the front compartment and into the rear compartment of the vehicle.

16. The assembly of claim 14, wherein the crossmember extends substantially across the width of the vehicle.

17. The assembly of claim 14, wherein the strips are formed of an elastomeric material.

18. The assembly of claim 14, wherein the suspending means comprises a pair of brackets and a pair of fasteners, the brackets being affixed across the top of the assembly, a pair of flanges being integral within the ceiling of the vehicle, the pair of brackets cooperating with the pair of flanges to enable the assembly to be slidably suspended from the flanges in any of a plurality of positions, each fastener cooperating with a bracket and a flange to retain the assembly to a a selected position within the flange.

* * * * *